March 10, 1942.  A. G. HACKETT ET AL  2,276,191
MEANS FOR ENSURING UNIDIRECTIONAL ROTATION OF A SHAFT
Filed June 4, 1938  2 Sheets-Sheet 2

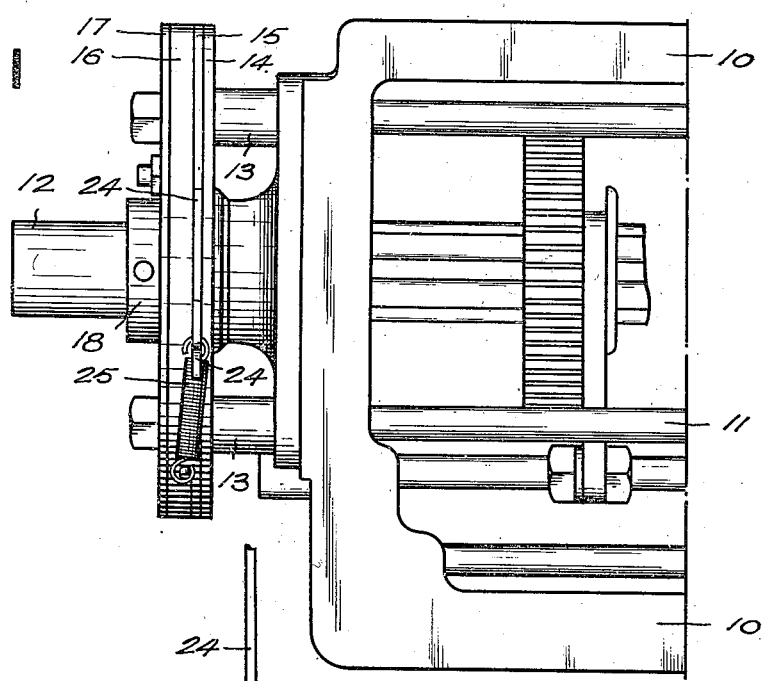
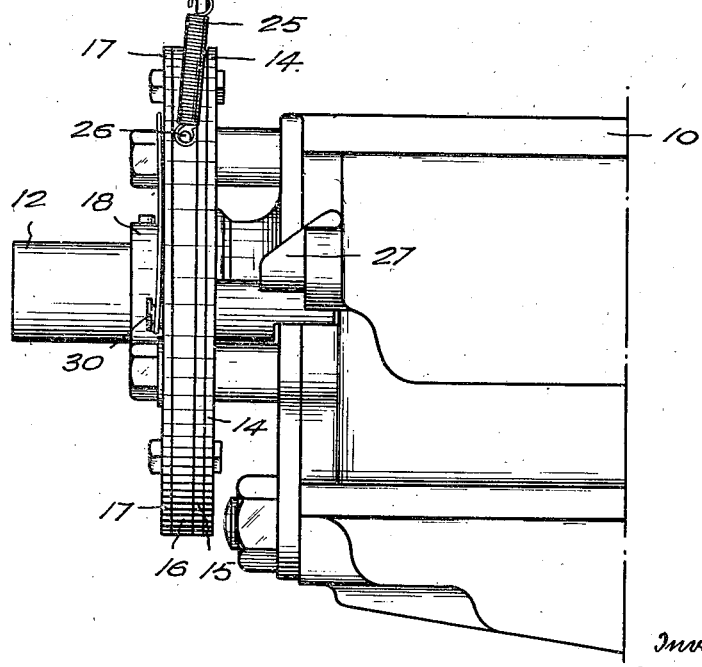

INVENTORS:
ALFRED GEORGE HACKETT
JAMES LESLIE EDWARDS
by Walter S. Bleston
ATTORNEY Patented Mar. 10, 1942

2,276,191

UNITED STATES PATENT OFFICE 2,276,191

MEANS FOR ENSURING UNIDIRECTIONAL ROTATION OF SHAFTS

Alfred George Hackett, Harborne, Birmingham, and James Leslie Edwards, Selly Park, Birmingham, England Application June 4, 1938, Serial No. 211,742 In Great Britain May 3, 1937

5 Claims.  (Cl. 188—30)

This invention relates to a new or improved means for ensuring uni-directional rotation of a shaft.

The invention is primarily designed for preventing unintentional reverse movement of a motor vehicle, as for example when starting away on an upward grade, and for positively holding the vehicle when parked on a slope but it is also applicable to the gearing of cranes, lifts and the like and forms a simple and effective safety device.

One object of our invention is to provide a device for this purpose which is simple in construction and positive in action.

Another object is to provide a device which can be applied to a motor vehicle without causing any binding effect on the gears in the change-speed mechanism so that there is no difficulty in engaging or disengaging the gears when starting away on a gradient.

According to one feature of our invention there is fitted to a shaft which is normally to be allowed to rotate in one direction only, as for example, the output or tail shaft in the gear-box or the cardan shaft of a motor vehicle, one-way detent mechanism comprising floating wedge members housed in angularly spaced wedge-shaped recesses in the inner edge of a stationary ring surrounding the shaft or a collar rotating with the shaft. In the normal direction of rotation of the shaft the frictional engagement between the wedges and the shaft or collar rocks the wedges over in one direction and holds them in an inoperative position. On any reverse movement of the shaft or collar the wedges are rocked over in the opposite direction and wedge between the outer faces of the recesses and the shaft or collar and the points of the wedges ride down inclined faces at the wider ends of the recesses which gives an additional locking movement to the wedges.

According to another feature of the invention the one-way detent mechanism comprises rollers housed in wedge-shaped recesses in the inner edge of a stationary disc surrounding the shaft or a collar rotating therewith and an angularly movable ring which is arranged between the disc and the collar and is in light frictional engagement with the collar so that it tends to rotate therewith, has gaps with inclined ends which in the normal direction of rotation of the collar engage the rollers and hold them in the wider ends of the recesses and out of contact with the collar so that the rollers are stationary. On any reverse movement of the collar the ring releases the rollers which then wedge between the narrower ends of the recesses and the collar to lock the collar against rotation.

The detent mechanism is preferably controlled from the gear-selecting mechanism so that when reverse gear is engaged the detent is held out of action and preferably it can also be held out of action by actuation of a separate control lever, but whether the detent has been held out of action by the engagement of reverse gear or by the actuation of the lever it is automatically brought into action again by a connection from the gear-selecting mechanism immediately a forward gear is engaged.

Two practical forms of our invention are illustrated by way of example in the accompanying drawings in which:

Figure 1 is a plan of the rear end of a motor car gear box fitted with a detent in accordance with our invention.

Figure 2 is a side elevation of Figure 1.

Figure 5:
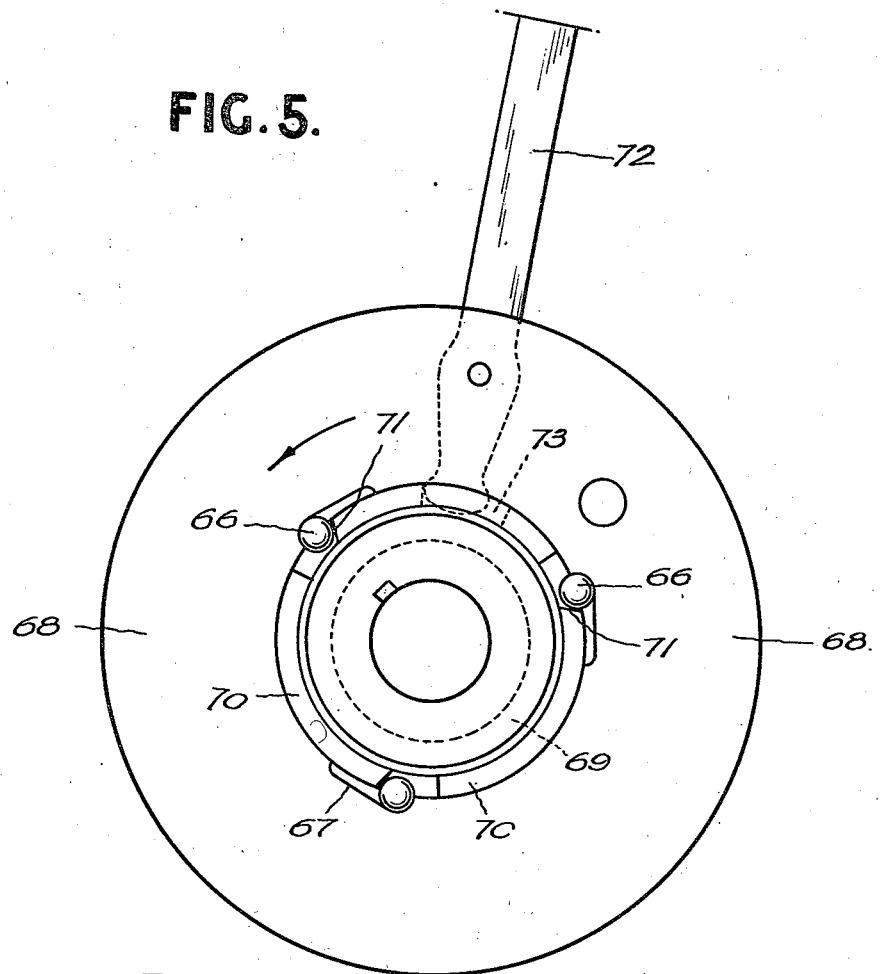
Figure 5 is an end elevation of an alternative detent mechanism employing rollers which normally do not rotate.

In the arrangement shown in Figures 1 to 4, 10 is a standard motor-car gear-box housing change-speed gearing selectively engaged from a gear-lever through longitudinally movable selector-rods of which that shown at 11 controls the engagement of reverse gear and the lowest forward gear. The output shaft 12 extends through the rear wall of the gear-box and is adapted to be connected by a universal joint to the cardan shaft.

Secured to the back of the gear-box in any convenient manner, as for example by bolts 13, is a disc 14 which with a spacing plate 15, a ring 16 and a cover disc 17 forms a shallow cylindrical casing surrounding a cylindrical collar or boss 18 keyed on the shaft. In the arrangement illustrated the casing is shown separate from the gear-box so that it can be fitted to existing cars but it may be built into or combined with the rear wall of the gear-box.

The ring 16 has an axial opening which is just a clearance fit around the collar 18 and in the inner edge of the ring are formed three angularly spaced wedge-shaped recesses 61.

Figure 3:
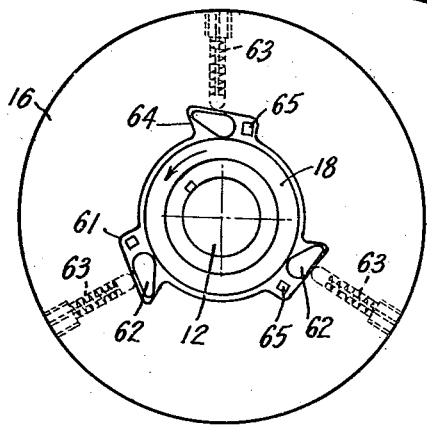
Figure 3 is an end elevation of the detent mechanism showing the detents in the inoperative position.

In each recess is housed a floating wedge 62 urged into engagement with the collar 18 by a spring-pressed plunger 63 mounted in a radial recess in the ring 16. In the normal direction of rotation of the collar 18 shown by the arrow in Figure 3 the frictional engagement between the wedges and the collar rocks the wedges over in a clockwise direction and holds them in an inoperative position as shown in Figure 3.

Figure 4:
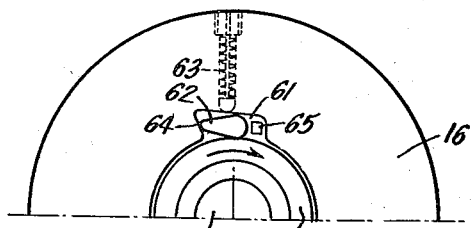
Figure 4 is a fragmentary view of the mechanism illustrated in Figure 3 showing one detent in the locking position.

On any reverse movement of the collar the wedges are rocked over in an anti-clockwise direction into the locking position shown in Figure 4 and the points of the wedges ride down inclined faces 64 at the wider ends of the recesses 61 which gives an additional locking movement to the wedge. With this arrangement a very slight reverse movement of the collar 18 brings the wedges instantly into action.

When necessary the wedges can be held out of action by the angular movement of pegs 65 which project into the narrower ends of the recesses 61 and are carried by an angularly movable disc which is housed in an annular recess in the spacing plate 15. This disc is provided with an upwardly extending handle lever 24 extending through a cut-away part of the plate 15. A tension spring 25 connected between the lever and a stud 26 on the ring 16 as shown in Figures 1 and 2 normally holds the disc in such a position that the pegs 65 are in the narrower ends of the recesses 61 as shown in Figure 3 so that they do not interfere with the locking action of the wedges. When the selector rod 11 is moved to engage reverse gear in the gear-box a tapered nose 27 on the rear end of the selector rod which is extended through the rear wall of the gear-box engages a part of the disc carrying the pegs 65 and moves the disc angularly so that the pegs force the wedges 62 into the wider ends of the slots and hold them out of action. The collar 18 can then be rotated freely in the reverse direction.

The disc carrying the pegs 65 may be held in this position by a spring-pressed catch 30 engaging a notch in the disc and remains in this position when the gear-lever is returned to neutral so that the vehicle can be moved freely in either direction by hand.

When the selector rod 11 is moved in the other direction to engage the first forward gear the nose 27 trips the catch and the disc carrying the pegs 65 is returned by the spring 25 into its normal position in which the wedges 62 are operative. If it is desired to put the locking mechanism out of action at any time without engaging reverse gear, this can be done by operating the lever 24 and the disc is returned automatically again when the first forward speed is engaged.

In the alternative construction shown in Figure 5 the locking detents are formed by rollers 66 housed in wedge-shaped recesses 67 in the inner edge of a stationary disc 68 surrounding a collar 69 rotating with the shaft. Between the disc and the collar is arranged an angularly movable ring 70 in which are formed gaps for the rollers, and one end of each gap is inclined as shown at 71. A shoulder on the ring, or the ring itself, is in light frictional contact axially with the collar 69, and in the normal direction of rotation of the collar shown by the arrow the ring is urged in an anti-clockwise direction and the inclined ends 71 of the gaps press the rollers outwardly into the wider ends of the recesses 67 as shown in the drawings so that the rollers are held out of contact with the collar. Thus the rollers are normally stationary and noise due to high speed rotation of the rollers is avoided. On any reverse rotation of the collar the ring 70 moves in a clockwise direction and allows the rollers to wedge between the narrow ends of the recesses 67 and the collar to lock the collar.

When it is desired to hold the rollers out of engagement with the collar for reversing, the ring is moved into the position shown in the drawings by a lever 72 pivoted on the disc 68 and having a rounded inner end engaging in a slot 73 in the ring. This slot is of sufficient length to allow the normal movements of the ring to take place without affecting the lever.

We claim:
1. Means for normally ensuring uni-directional rotation of a shaft comprising a disc on the shaft, a stationary ring surrounding said disc, wedge-shaped recesses in the inner edge of said ring, floating wedges located in said recesses, spring-pressed plungers holding said wedges in frictional contact with the disc, said wedges being rocked over by their frictional contact with the disc into an inoperative position in the normal direction of rotation of the disc and being rocked over in the other direction and forced against the ends of the recesses to lock the disc on any reverse rotation of the disc, and means for positively holding the wedges out of action when it is desired to reverse the rotation of the shaft.

2. Means for normally ensuring uni-directional rotation of a shaft comprising a collar rotating with the shaft, a stationary disc surrounding the collar, wedge-shaped recesses in the inner edge of the disc, rollers housed in the recesses, an angularly movable ring between the disc and the collar, gaps in said ring for the rollers, inclined ends to said gaps, a light frictional engagement between said ring and said collar so that in the normal direction of rotation of the collar the inclined ends of the gaps hold the rollers in the wider ends of the recesses out of contact with the collar and on reverse rotation of the collar the rollers are moved to the narrower ends of the recesses and wedge between the disc and the collar, and means for positively moving the ring angularly to hold the rollers stationary and out of contact with the collar when it is desired to reverse the rotation of the shaft.

3. Means for normally ensuring uni-directional rotation of a shaft comprising a collar rotating with the shaft, a stationary annular member surrounding the collar, said annular member having wedge-shaped recesses in its inner edge, floating locking members located in said recesses, said recesses tapering in a direction opposite to the normal direction of rotation of said shaft, the wider portion of each recess having an end face against which the associated locking member is urged by a frictional force resulting from the rotation of the shaft in the normal direction so as to remain in an inoperative position and immovable as long as the shaft rotates in its normal direction, means in frictional engagement with said collar and disposed between said stationary annular member and said collar and operable to cause said locking members to wedge between said annular member and said collar upon rotation of the collar in the reverse direction, and means for positively holding the locking members in their inoperative position when it is desired to reverse the rotation of the collar and shaft.

4. Means for normally ensuring uni-directional rotation of a shaft comprising a collar rotating with the shaft, a stationary disc surrounding the collar, wedge-shaped recesses in the inner edge of the disc, rollers housed in the recesses, an angularly movable ring between the disc and the collar, gaps in said ring for the rollers, inclined ends to said gaps, and a light frictional engagement between said ring and said collar so that in the normal direction of rotation of the collar the inclined ends of the gaps hold the rollers in the wide ends of the recesses out of contact with the collar and on a reverse rotation of the collar the rollers are moved to the narrower ends of the recesses and wedge between the disc and the collar.

5. Means for normally ensuring uni-directional rotation of a shaft comprising a collar rotating with the shaft, a stationary member surrounding the collar, wedge-shaped recesses in the inner edge of said member, floating locking members housed in the recesses, said recesses tapering in a direction opposite to the normal direction of rotation of the collar so as to wedge the locking members against the collar on rotation of the latter in the reverse direction, an incline in each of said recesses for engagement with the locking member floating in the respective recess, each incline being so shaped as to urge the engaged locking member into the deepest portion of its recess owing to a frictional force set up between one of the interengaging parts and the collar when the latter rotates in the normal direction whereby the locking members are held immovable while the collar rotates in that direction, and means for positively holding the locking members in the inoperative position when it is desired to reverse the rotation.

ALFRED GEORGE HACKETT.
JAMES LESLIE EDWARDS.